United States Patent
Yokota et al.

(10) Patent No.: US 6,608,160 B2
(45) Date of Patent: Aug. 19, 2003

(54) COMPOSITION FOR PRODUCTION OF COVER PACKING AND PROCESS FOR PRODUCTION OF COVER PACKING USING THE SAME

(75) Inventors: Hiroei Yokota, Kanagawa-ken (JP); Sumito Nii, Kangawa-ken (JP); Osamu Takata, Kanagawa-ken (JP)

(73) Assignee: Nippon Polyurethane Industry Co., Ltd., Tokyo (JP)

( * ) Notice: Subject to any disclaimer, the term of this patent is extended or adjusted under 35 U.S.C. 154(b) by 3 days.

(21) Appl. No.: 09/916,321

(22) Filed: Jul. 30, 2001

(65) Prior Publication Data
US 2002/0040069 A1 Apr. 4, 2002

(30) Foreign Application Priority Data
Aug. 21, 2000 (JP) ........................................ 2000-249166

(51) Int. Cl.$^7$ .............................................. C08G 18/80
(52) U.S. Cl. ................... 528/45; 521/155; 521/159; 521/128; 521/130; 521/170; 521/174; 528/68; 528/85
(58) Field of Search ............................... 528/45, 68, 85; 521/155, 159, 170, 174, 128, 130

(56) References Cited

U.S. PATENT DOCUMENTS

| | | | |
|---|---|---|---|
| 5,043,379 A | * | 8/1991 | Ota et al. .................... 524/507 |
| 5,210,127 A | * | 5/1993 | Werner et al. ............... 521/131 |
| 6,111,048 A | * | 8/2000 | Asahina et al. ......... 252/182.22 |
| 6,248,848 B1 | * | 6/2001 | Tamao et al. ................ 526/274 |

FOREIGN PATENT DOCUMENTS

JP        61-9481 A        1/1986

* cited by examiner

Primary Examiner—John M. Cooney, Jr.
(74) Attorney, Agent, or Firm—Browdy and Neimark, P.L.L.C.

(57) ABSTRACT

A composition for production of cover packing, comprising:
(A) a blocked isocyanate,
(B) an active hydrogen group-containing compound having average two or more functional groups,
(C) an organic substance powder having an average particle diameter of 40 to 250 μm, and
(D) an inorganic substance powder having an average particle diameter of less than 40 μm; and a method for production of cover packing using the composition.

With this composition which is a one-pack type, curable composition, no apparatus for mixing the main material and the curing agent is required; by heating, dissociation of blocking agent and completion of reaction are allowed to take place simultaneously; and a cover packing superior in mechanical strength, etc. can be formed. Further with the composition, there is no need of using a high-performance, high-pressure pump or a mold of good sealing; curing takes place in several minutes after mixing at a mold temperature; the cured material is releasable from the mold despite of the small hardness; and superior discharging, lining and driplessness are obtained.

21 Claims, No Drawings

COMPOSITION FOR PRODUCTION OF COVER PACKING AND PROCESS FOR PRODUCTION OF COVER PACKING USING THE SAME

BACKGROUND OF THE INVENTION (1) Field of the Invention

The present invention relates to a one-pack type curable composition for production of cover packing, as well as to a method for producing a cover packing superior in properties, etc. using the composition.

(2) Related Prior Art

Polyurethane elastomer molded articles have been known to have excellent physical properties such as high tensile strength, fatigue resistance, good low-temperature flexibility, abrasion resistance and the like.

Owing to these properties, they have been produced extensively as rolls, packings, various machine parts, automobile parts, electronic appliance parts, etc.

For production of a polyurethane resin, there is generally known, for example, a method of reacting a high-molecular polyhydroxyl compound, a low-molecular polyhydroxyl compound as a chain extender and an organic diisocyanate compound in the presence or absence of a catalyst.

This method is largely classified into two methods, i.e. a one-shot method of casting the above three components simultaneously and giving rise to a reaction among them, and a method of first synthesizing an isocyanate group-terminated urethane prepolymer from the high-molecular polyhydroxyl compound and the organic diisocyanate compound and then allowing the low-molecular polyhydroxyl compound to act on the isocyanate group-terminated urethane prepolymer for crosslinking reaction.

In, for example, JP-A-63-8685 is disclosed a method for obtaining a polyurethane elastomer having a JIS-A hardness of 78 to 80 by a reacting an isocyanate group-terminated urethane prepolymer (a main material) obtained from a polyester polyol and diphenylmethane diisocyanate, with a mixture (a crosslinking agent) of 1,4-butanediol and trimethylolpropane and conducting post-curing at 140° C. The polyurethane elastomer obtained by this method is superior in mechanical strength and is well balanced particularly as a cleaning blade for electronic photocopier.

As an example of the application of a polyurethane resin to a cover packing for container such as pail, open drum or the like, there is a technique described in JP-A-61-9481. In this technique, a first liquid containing a urethane prepolymer as a main component and a second liquid containing a polyol as a main component are mixed and, at that time, the viscosity of the mixture (for reaction) is controlled at 200 to 20,000 mPa·s at 0 to 60° C.

In a casting operation using an industrial machine, a tank for main material component and a tank for curing agent component are prepared separately; the two components are transferred from the respective tanks into a mixing apparatus in given proportions, using a metering pump. Mixing is conducted by mechanical stirring or high-pressure collision; the resultant mixture is cast into a mold; and a heat treatment is conducted for a given length of time to obtain an elastomer molded article.

Mechanical stirring is conducted generally at ordinary pressure; therefore, in the mechanical stirring, there is needed a flowing time for the mixture of the main material component and the curing agent component to be cast into the mold and there has been a limit in order to obtain a shorten curing time. In mixing by high-pressure collision, a high-performance high-pressure pump and a mold of good sealing are necessary.

Spraying is used in covering of a material of large area such as floor material or the like. This method is not applicable to molding of a shaped article such as cover packing intended in the present invention.

When a mixture for reaction, which may be any of a two-pack type composition such as described in JP-A-61-9481 and a one-pack type composition comprising a blocked isocyanate and a polyhydroxyl compound, is heated to high temperatures for curing or for acceleration of decomposition (of blocked isocyanate) and reaction, the viscosity of the mixture generally decreases before the reaction and curing take place. As a result, there have been a problem that when a cover near a discharging port is moved, the packing formed comes to have a non-uniform thickness owing to the movement of the cover and further the reaction mixture flowing out of the groove of the cover stains a production line inside a heating furnace, and a problem that when the reaction mixture shows dripping at the completion of discharging, cover portions other than the groove are stained (discharging should be made only to the groove).

OBJECTS AND SUMMARY OF THE INVENTION

The object of the present invention lies in solving the above-mentioned problems of the known prior art and providing (1) a composition for production of cover packing which is a one-pack type, curable composition requiring no apparatus for compounding two or three liquids [a main material(s) and a curing agent] and which, when heated, causes dissociation of blocking agent and completion of reaction simultaneously and gives a cured material superior in mechanical strength, etc. and (2) a method for producing a packing for cover using the above composition. Other object of the present invention lies in providing a composition for production of cover packing, which requires no high-performance high-pressure pump or no mold of good sealing, is cured in several minutes after the mixing at a mold temperature to give a cured material releasable from the mold despite of the low hardness, and is superior in dischargeability, lining ability and driplessness, and a method for producing a packing for cover using the above composition.

The present inventors made a study and found out that the above objects could be achieved by using a blocked isocyanate, an active hydrogen group-containing compound, an organic substance powder and an inorganic substance powder. The finding has led to the completion of the present invention.

The present invention lies in the following (1) and (2).
(1) A composition for production of cover packing, comprising:
   (A) a blocked isocyanate,
   (B) an active hydrogen group-containing compound having average two or more functional groups,
   (C) an organic substance powder having an average particle diameter of 40 to 250 μm, and
   (D) an inorganic substance powder having an average particle diameter of less than 40 μm.
(2) A method for producing a packing for cover, which comprises subjecting the above composition for production of cover packing to heat-curing at 100 to 250° C.

DETAILED DESCRIPTION OF THE INVENTION

The present invention is described in detail below.

The blocked isocyanate (A) used in the present invention is a compound obtained by reacting an isocyanate (e.g. an aromatic polyisocyanate, an aliphatic polyisocyanate, an alicyclic polyisocyanate, or a modification thereof) with a blocking agent to block the isocyanate group.

As specific examples of the above isocyanate, there can be mentioned aromatic diisocyanates such as 2,4-tolylene diisocyanate, 2,6-tolylene diisocyanate, xylylene-1,4-diisocyanate, xylylene-1,3-diisocyanate, xylylene-1,2-diisocyanate, 4,4'-diphenylmethane diisocyanate, 2,4'-diphenylmethane diisocyanate, 2,2'-diphenylmethane diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, tetramethylxylylene diisocyanate and the like; aliphatic diisocyanates such as tetramethylene diisocyanate, hexamethylene diisocyanate, 3-methyl-1,5-pentane diisocyanate, lysine diisocyanate and the like; alicyclic diisocyanates such as hydrogenated tolylene diisocyanate, hydrogenated xylylene diisocyanate, hydrogenated diphenylmethane diisocyanate, hydrogenated tetramethylxylylene diisocyanate, isophorone diisocyanate and the like; urethane bond-containing polyisocyanates derived from the above organic diisocyanates, allophanate bond-containing polyisocyanates derived from the above organic diisocyanates, urea bond-containing polyisocyanates derived from the above organic diisocyanates, biuret bond-containing polyisocyanates derived from the above organic diisocyanates, carbodiimide bond-containing polyisocyanates derived form the above organic diisocyanates, uretonimine bond-containing polyisocyanates derived form the above organic diisocyanates, uretdione bond-containing polyisocyanates derived from the above organic diisocyanates, and isocyanurate bond-containing polyisocyanates derived from the above organic diisocyanates. These isocyanates can be used singly or in admixture of two or more kinds.

As the above isocyanate, there is also preferred an isocyanate group-terminated prepolymer obtained by reacting one of the above-mentioned polyisocyanates with a active hydrogen group-containing compound.

As the isocyanate used for obtaining the above prepolymer, there are preferred a mixture of 2,4-tolylene diisocyanate and 2,6-tolylene diisocyanate (these tolylene diisocyanates are hereinafter referred to as TDI), diphenylmethane diisocyanate, and carbodiimide group-containing diphenylmethane diisocyanate.

The active hydrogen group-containing compound is a component used for producing an ordinary polyurethane resin. As such a compound, there can be mentioned, for example, high-molecular polyols such as adipate type polyol, lactone type polyol, carbonate type polyol, ether type polyol and the like.

Of the above polyols, an ether type polyol is preferred and a specific example is a polyoxyalkylene polyol. As this polyol, preferred is a polyol having a number-average molecular weight of 500 to 10,000 obtained by adding an alkylene oxide (e.g. ethylene oxide or propylene oxide) to an active hydrogen group-containing low-molecular compound of two to four functionalities which is a starting material.

Preferably, the alkylene oxide is propylene oxide and its content is 50% or more.

The isocyanate group-terminated prepolymer can be obtained, for example, by adding an active hydrogen group-containing compound into an excess of an isocyanate and giving rise to a reaction at 80 to 90° C. for 1 to 2 hours. The isocyanate group content in the prepolymer is preferably 1 to 20% by weight, more preferably 2 to 10% by weight.

As the blocking agent for eliminating the reactivity of isocyanate group, there can be used ε-caprolactam, methyl ethyl ketone oxime, ethyl acetoacetate, etc.

The blocking of isocyanate group can be conducted by adding a blocking agent into an isocyanate and giving rise to a reaction between them. When the isocyanate is an isocyanate group-terminated prepolymer, it is preferred that blocking is conducted successively to the production of the prepolymer, for a simplified operation.

The blocking is preferably conducted using a blocking agent of an equimolar or slightly excessive amount relative to an isocyanate. The blocked isocyanate obtained is preferably liquid at ordinary temperature to 80° C., for handling.

As the active hydrogen group-containing compound (B) having average two or more functional groups, there can be mentioned a polyol, a polyamine, etc. The number-average molecular weight of the compound (B) is preferably 62 to 12,000.

As the polyol, there can be mentioned high-molecular polyols used in synthesis of the above-mentioned isocyanate group-terminated prepolymer. Low-molecular polyols each having a molecular weight of 62 to 500 can also be used more preferably. Specific examples are ethylene glycol, 1,2-propanediol, 1,3-propanediol, 1,2-butanediol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, cyclohexane-1,4-diol, cyclohexane-1,4-dimethanol, dimethylolheptane, dimer acid diol, trimethylolpropane, glycerine, hexanetriol, quadrol, bisphenol A, hydrogenated bisphenol A, ethylene oxide or propylene oxide adducts thereof, and N,N,N',N'-tetrakis(2-hydroxypropyl)ethylenediamine.

As the polyamine, there can be mentioned low-molecular polyamines each having a number-average molecular weight of less than 500, such as 3,3'-dimethyl-4,4'-diaminodicyclohexylmethane, 3-amino-1-cyclohexylaminopropane, isophoronediamine, 1,3-bis(aminomethyl)cyclohexane and the like; and high-molecular polyamines each having a number-average molecular weight of 500 or more, such as polyoxyalkylene polyamine obtained by converting the terminal hydroxyl group of polyether polyol to amino group. As a specific example of the commercial products, there is a high-molecular polyamine having a number-average molecular weight of 1,000 to 5,000 and two to three amino functional groups, marketed by Hanzman Co.

As the low-molecular polyamine, which constitutes a hard segment, there is preferred one having relatively low reactivity with isocyanate group; however, use of MOCA (containing halogen) should be avoided for the toxicity.

As the amino group of the low-molecular polyamine, there are preferred, for the reactivity, an amino group adjacent to an alkyl group, both bonding to an aromatic ring, and a secondary amino group bonding to an aromatic ring. With an aliphatic primary diamine having too high reactivity with isocyanate group, it is difficult to obtain a high-molecular elastomer.

When hydroxyl group and amino group are present together, since they have extremely different reactivities to isocyanate group, the amino group reacts with the isocyanate group first and the hydroxyl group tends to remain unreacted; as a result, the resulting resin tends to have no sufficiently high molecular weight and be inferior in mechanical strength. Therefore, when a polyol and a polyamine are used in combination, they need be compounded in view of their reactivity and it is preferred that a high-molecular polyol is integrated into an isocyanate-terminated prepolymer and a high-molecular compound having amino group at the terminals is used as a high-molecular compound. It is also preferred that a tertiary amine group-containing, hydroxyl group-terminated compound is used as a low-molecular polyol.

The blocked isocyanate (A) and the active hydrogen group-containing compound (B) having average two or more functional groups are reacted in a (total latent isocyanate groups)/(total active hydrogen groups) molar ratio of preferably 0.9–1.5/1.0, particularly preferably 1.0–1.1/1.0.

As the organic substance powder (C) having an average particle diameter of 40 to 250 $\mu$m, there can be mentioned powders of natural high-molecular compounds and synthetic high-molecular compounds. When it is desired to use a powder uniform in particle shape and particle diameter, a synthetic high-molecular compound powder is preferred, and a polyurethane resin powder homologous to the polyurethane resin obtained from the main components (A) and (B) of the present composition for production of cover packing is particularly preferred.

The polyurethane resin powder can be obtained by grinding of resin, precipitation of resin from resin solution, coagulation of aqueous resin emulsion and powderization of coagula, dispersion polymerization in non-aqueous state, etc. Preferred in the present invention is a polyurethane resin powder which is obtained by the dispersion polymerization in non-aqueous state and which is small in particle diameter distribution and roughly spherical in shape. As such a polyurethane resin powder, there are, for example, Pearlthane Series (commercial products of Nippon Polyurethane Industry Co., Ltd.).

The "average particle diameter" of the organic substance powder of the present invention is a cumulative percentage value at 50% of the particle diameter distribution obtained using a laser type particle size analyzer.

The average particle diameter of the present organic substance powder is 40 to 250 $\mu$m, preferably 70 to 200 $\mu$m. The amount of the organic substance powder compounded is preferably 1 to 10% by weight, more preferably 1 to 3% by weight in the present composition for production of cover packing.

As the inorganic substance powder (D) having an average particle diameter of less than 40 $\mu$m, there can be mentioned calcium carbonate, barium sulfate, clay, diatomaceous earth, silica, etc.

The "average particle diameter" of the inorganic substance powder is a cumulative percentage value at 50% of the particle size distribution determined using the above-mentioned laser type particle size analyzer or Coulter Counter TA-2 (a product of Coulter Electronics Co.) and an aperture tube of 30 $\mu$m.

The average particle diameter of the inorganic substance powder is controlled preferably at less than 40 $\mu$m, particularly preferably at 30 $\mu$m or less by using, in combination, an ultrafine power having an average particle diameter of 0.5 to 10 $\mu$m and a fine powder having an average particle diameter of 10 to 40 $\mu$m.

The amount of the inorganic substance powder compounded is preferably 1 to 20% by weight, more preferably 2 to 6% by weight in the present composition for production of cover packing. The inorganic substance powder and the organic substance powder are compounded in a weight ratio of 0.2:1 to 5:1. When they are compounded in a ratio outside the above range, the resulting composition is inferior in fluidity and driplessness.

The total amount [(C)+(D)] of the organic substance powder and the inorganic substance powder compounded is preferably 1 to 30% by weight, more preferably 3 to 9% by weight in the present composition [(A)+(B)+(C)+(D)] for production of cover packing. When the total amount is outside this range, the resulting composition is inferior in fluidity and driplessness and the packing obtained therefrom has inferior surface smoothness.

In the present composition, a heat-decomposable blowing agent can also be used. When, in a resin, the amount of the hard segment consisting of urethane group or urea group is increased in order to improve the tensile strength of the resin, the resin becomes hard. Even if the resin is too hard in a non-foamed state and cannot be used per se as a packing, the resin becomes flexible and can be used as a packing if the resin is foamed. The amount of the heat-decomposable blowing agent used is determined in view of the balance of the hardness, specific gravity and other properties of the intended packing. A larger amount of the blowing agent results in larger expansion ratio, smaller specific gravity and higher flexibility but in lower compression set, etc.

As the heat-decomposable blowing agent, there can be mentioned compounds of sodium carbonate type, hydrazine type, nitroso type, azo type, etc. An azo type heat-decomposable blowing agent is preferred, and specific examples thereof are azobisisobutyronitrile and azodicarbonamide.

In the present composition, there can also be used, as necessary, additives ordinarily used in production of polyurethane resin, such as decomposition accelerator for heat-decomposable blowing agent, catalyst, plasticizer, internal releasing agent, reinforcing agent, stabilizer and the like.

As the decomposition accelerator for heat-decomposable blowing agent, there can be mentioned organic acid metal salts (e.g. zinc stearate), metal oxides (e.g. zinc oxide), metal hydroxides, etc. These decomposition accelerators, when used in combination with an azo type heat-decomposable blowing agent, can give rise to smooth blowing of polyurethane resin even at relatively low temperatures; therefore, the properties of the packing obtained can be controlled appropriately.

As the catalyst, there can be mentioned, for example, dibutyltin dilaurate, dioctyltin dilaurate, triethylamine, bismuth neodecanate and diazabicycloundecene. No catalyst is needed substantially when a highly reactive polyamine is used as the active hydrogen group-containing compound.

Use of a plasticizer in the present composition for production of cover packing can reduce the viscosity of the composition. However, in such a composition, the plasticizer moves into the contents of the container using the cover and loses its function as plasticizer, resulting in the deterioration of packing capability; therefore it is preferred not to use any plasticizer.

In the present composition for production of cover packing, known additives other than mentioned above can also be used in combination. As such additives, there can be mentioned, for example, a dye and a pigment both for coloring of molded article, an inorganic filler (e.g. glass fiber) for imparting improved shaped retainability and bending strength to molded article, a flame retardant, an antioxidant, an ultraviolet absorber, a light stabilizer, an electrical insulation improver, a fungicide and an amide type wax.

The present composition which is a one-pack type, unlike two-pack type compositions comprising a main material and a curing agent, need not be filled into a mold or a groove of cover within a pot life in and after the mixing.

It is also possible to fill the present composition by using a discharging machine of small capacity, or manually. In the present composition, by heating it to 100 to 250° C., the blocking agent is dissociated and a curing reaction is allowed to take place. Therefore, it is preferred to use such a mold or apparatus as to enable rapid temperature elevation of the composition. It is also possible to place a thin mold in an oven of high temperature, or to rapidly heat the composition with the heating medium of a mold and, after the curing of the composition, rapidly cool the cured material and taking it out of the mold. Thus, the inside of the composition to be molded need be heated, by thermal conduction, to a temperature at least equal to the decomposition temperature of the blocked isocyanate component (A) of the composition; therefore, the molded article obtained is preferred to have a thickness of 0.1 to 10 mm, particularly 1 to 7 mm.

When a releasing agent is used, a packing made of a cured resin composition alone can be obtained; when a grooved cover is used without using any releasing agent, there can be obtained a cover with packing in which a cover and a cured resin composition are integral.

The composition for production of cover packing according to the present invention has thixotropy and therefore, when used for lining of the groove of a cover at high temperatures, is superior in dischargeablity, lining ability and driplessness. Therefore, the present method using such a composition can produce a packing integrated into a cover, without using a high-pressure RIM casting machine. As a result, the packing produced by the present method has a uniform thickness, has a hardness of 5 to 60 as measured by a hardness A tester specified by JIS K 7312, and is superior in balance of mechanical properties, etc. The cover packing obtained by the present method is superior also in solvent resistance and sealing ability, and is suited for sealing of pail, etc.

DESCRIPTION OF THE PREFERRED EMBODIMENTS

The present invention is described in more detail below by way of Examples and Comparative Examples. However, the present invention is in no way restricted by the Examples.

The raw materials used are as follows.

Pearlthane U-202B: a thermoplastic polyurethane resin powder having an average particle diameter of 100 $\mu$m, produced by Nippon Polyurethane Industry Co., Ltd.

Calcium carbonate: average particle diameter=30 $\mu$m, produced by Sankyo Seifun K.K.

Nipgel AZ 200: a silica powder having an average particle diameter of 2.5 $\mu$m, produced by Nippon Silica Industrial Co., Ltd.

C-2532: a TDI-polyoxypropylene glycol type isocyanate blocked by $\epsilon$-caprolactam, having average two latent isocyanate groups and a latent isocyanate group content of 4.1%, produced by Nippon Polyurethane Industry Co., Ltd.

Laromine C-260: 3,3'-dimethyl-4,4'-diaminocyclohexylmethane having two functional groups and a molecular weight of 238, produced by BASF Co.

THPEA: N,N,N',N'-tetrakis(2-hydroxypropyl) ethylenediamine

TMP: trimethylolpropane

Heat-decomposable blowing agent: azodicarbonamide

EXAMPLE 1

There were mixed 5.8 g of Laromine C-260, 3.3 g of THPEA and 100 g of C-2532. Thereto were added 2 g of a heat-decomposable blowing agent, 0.5 g of zinc oxide and 0.5 g of zinc stearate, followed by uniform mixing. Thereinto were added 3 g of Pearlthane U-202B, 2 g of calcium carbonate and 2 g of Nipgel AZ 200, and stirring was conducted until a uniform dispersion was obtained.

The dispersion was made vacuum to remove the air bubbles present therein, and then charged into the groove of the cover of a metallic pail having a groove (a to-be-sealed portion) of 7 mm in depth, 8.5 mm in width and 940 mm in outer circumference, with the cover being rotated, so that the charged dispersion had a thickness of 7 mm after blowing. The charging was completed when the cover was rotated 360°. The resulting cover was placed in a heating furnace of 200° C. for 3 minutes, whereby was produced a cover for metallic pail into which a packing was integrated.

The packing had a uniform thickness. The dispersion showed good driplessness and did not adhere to cover portions other than the groove.

In order to examine the performance of the above-produced cover with packing for metallic pail, pails each containing different contents were fitted with the cover and subjected to a leakage test of 40° C.×1 month.

Separately, the groove of the same cover as used above was coated with a releasing agent and subjected to the same operation as above, whereby was produced a packing per se. The packing was measured for physical properties according to JIS K 7312.

The results are shown in Table 1 and Table 2.

EXAMPLE 2

7 g of THPEA was mixed with 100 g of C-2532. Thereto were added 2 g of a heat-decomposable blowing agent, 0.5 g of zinc oxide and 0.5 g of zinc stearate, followed by uniform mixing. Thereinto were added 3 g of Pearlthane U-202B and 4 g of calcium carbonate, and stirring was conducted until a uniform dispersion was obtained.

The dispersion was subjected to the same operation as in Example 1 to obtain a cover for metallic pail into which a packing was integrated.

The packing had a uniform thickness. The dispersion showed good driplessness and did not adhere to cover portions other than the groove.

In order to examine the performance of the above-produced cover with packing, pails each containing different contents were fitted with the cover and subjected to a leakage test of 40° C.×1 month.

Separately, the groove of the same cover as used above was coated with a releasing agent and subjected to the same operation as above, whereby was produced a packing per se. The packing was measured for physical properties according to JIS K 7312.

The results are shown in Table 1 and Table 2.

EXAMPLE 3

There were mixed 2.2 g of TMP, 6.0 g of Laromine C-260 and 100 g of C-2532. Thereto were added 2 g of a heat-decomposable blowing agent, 0.5 g of zinc oxide and 0.5 g of zinc stearate, followed by uniform mixing. Thereinto were added 3 g of Pearlthane U-202B and 4 g of calcium carbonate, and stirring was conducted until a uniform dispersion was obtained.

The dispersion was subjected to the same operation as in Example 1 to obtain a cover for metallic pail into which a packing was integrated.

The packing had a uniform thickness. The dispersion showed good driplessness and did not adhere to cover portions other than the groove.

In order to examine the performance of the above-produced cover with packing, pails each containing different contents were fitted with the cover and subjected to a leakage test of 40° C.×1 month.

Separately, the groove of the same cover as used above was coated with a releasing agent and subjected to the same operation as above, whereby was produced a packing per se. The packing was measured for physical properties according to JIS K 7312.

The results are shown in Table 1 and Table 2.

Comparative Example 1

There were mixed 5.8 g of Laromine C-260, 3.3 g of THPEA and 100 g of C-2532. Thereto were added 2 g of a heat-decomposable blowing agent, 0.5 g of zinc oxide and 0.5 g of zinc stearate, followed by uniform mixing to obtain a dispersion.

Then, the dispersion was subjected to the same operation as in Example 1 to produce a cover for metallic pail into which a packing was integrated.

The dispersion showed a striking reduction in viscosity at 200° C., caused liquid movement during the lining for the groove of a cover owing to the small vibration or inclination of the cover, and gave a packing having a non-uniform thickness of 4 to 7 mm. Also, the dispersion showed dripping and adhered to cover portions other than the groove.

Comparative Example 2

There were mixed 5.8 g of Laromine C-260, 3.3 g of THPEA and 100 g of C-2532. Thereto were added 2 g of a heat-decomposable blowing agent, 0.5 g of zinc oxide and 0.5 g of zinc stearate, followed by uniform mixing. Thereinto was added 7 g of calcium carbonate, and stirring was conducted until a uniform dispersion was obtained.

Then, the dispersion was subjected to the same operation as in Example 1 to produce a cover for metallic pail into which a packing was integrated.

The packing formed had a uniform thickness, but the dispersion showed dripping and adhered to cover portions other than the groove.

Leakage Test for Pail

Into a pail was filled 10 liters of one of the contents shown in Table 1. Then, the pail was fitted with the cover produced in Example 1, 2 or 3. Thereafter, the pail was fell sideways and allowed to stand at an ambient temperature of 40° C. for 1 month, after which the leakage of the contents was examined. 10 pails were used for one kind of contents and the presence of any pail showing leakage was observed. The rating standard in Table 1 is as follows.

◯: There is no pail showing liquid leakage.

×: There are pails showing liquid leakage.

TABLE 1

| Test liquid | Examples | | |
|---|---|---|---|
| | 1 | 2 | 3 |
| Kerosene | ◯ | ◯ | ◯ |
| Engine oil | ◯ | ◯ | ◯ |
| Turbine oil | ◯ | ◯ | ◯ |
| 10% aqueous sodium hydroxide solution | ◯ | ◯ | ◯ |
| n-Hexane | ◯ | ◯ | ◯ |

As shown in Table 1, there was no leakage in any pail.

TABLE 2

| Physical properties | Examples | | |
|---|---|---|---|
| | 1 | 2 | 3 |
| Density (g/cm³) | 0.75 | 0.73 | 0.73 |
| Hardness A | 22 | 20 | 15 |
| Tensile strength (MPa) | 3 | 3 | 3 |
| Compression set (%) | 40 | 42 | 45 |

What is claimed is:

1. A method for producing a packing for cover, which comprises subjecting to heat-curing at 100 to 250° C. a liquid composition comprising:

(A) a blocked isocyanate, (B) an active hydrogen group-containing compound having on average two or more functional groups, (C) an organic substance powder having an average particle diameter of 40 to 250 μm, and (D) an inorganic substance powder having an average particle diameter of less than 40 μm.

2. The method according to claim 1, wherein the hydrogen group-containing compound (B) has a number-average molecular weight of 62 to 12,000.

3. The method according to claim 1, wherein the active hydrogen group-containing compound (B) is a low-molecular polyol having a molecular weight of 62 to 500.

4. The method according to claim 1, wherein the organic substance powder (C) is a powder selected from the group consisting of natural high-molecular compounds and synthetic high-molecular compounds.

5. The method according to claim 1, wherein the organic substance powder (C) is a polyurethane resin powder.

6. The method according to claim 1, wherein the organic substance powder (C) is a polyurethane resin powder homologous to the polyurethane resin obtained from components (A) and (B).

7. The method according to claim 1, wherein the average particle diameter of the organic substance powder (C) is 70 to 200 μm, and the amount of the organic substance powder (C) is 1 to 10% by weight based on the weight of said composition.

8. The method according to claim 1, wherein the inorganic substance powder (D) is selected from the group consisting of calcium carbonate, barium sulfate, clay, diatomaceous earth and silica.

9. The method according to claim 1, wherein the average particle diameter of the inorganic substance powder (D) is adjusted to 40 μm or less by using, in combination, (1) an ultrafine powder having an average particle diameter of 0.5 to 10 μm and (2) a fine powder having an average particle diameter of 10 to 40 μm, and wherein the total amount of the inorganic substance powder (D) compounded is 1 to 20% by weight based on the weight of the composition.

10. The method according to claim 1, wherein the total amount of the organic substance powder (C) and the inorganic substance powder (D) is 1 to 30% by weight based on the weight of the composition.

11. The method according to claim 1, wherein the composition further comprises a heat-decomposable blowing agent.

12. The method according to claim 1, wherein the composition further comprises a heat-decomposable blowing agent and a decomposition accelerator for the heat-decomposable blowing agent.

13. The method according to claim 1, wherein the composition further comprises a heat-decomposable blowing agent, a decomposition accelerator for the heat-decomposable agent and an additive selected from the group consisting of a catalyst, a plasticizer, an internal releasing agent, a reinforcing agent and a stabilizer.

14. The method according to claim 1, wherein the composition further comprises a heat-decomposable blowing agent and an additive selected from the group consisting of a catalyst, a plasticizer, an internal releasing agent, a reinforcing agent and a stabilizer.

15. The method according to claim 11, wherein the heat-decomposable blowing agent is a sodium carbonate compound, a hydrazine compound, a nitroso compound or an azo compound.

16. The method according to claim 12, wherein the heat-decomposable blowing agent is a sodium carbonate compound, a hydrazine compound, a nitroso compound or an azo compound.

17. The method according to claim 13, wherein the heat-decomposable blowing agent is a sodium carbonate compound, a hydrazine compound, a nitroso compound or an azo compound.

18. The method according to claim 14, wherein the heat-decomposable blowing agent is a sodium carbonate compound, a hydrazine compound, a nitroso compound or an azo compound.

19. The method according to claim 1, wherein the composition further comprises an additive selected from the group consisting of a catalyst, a plasticizer, an internal releasing agent, a reinforcing agent and a stabilizer.

20. The method according to claim 1, wherein the heat-curing is conducted in a device which enables rapid temperature elevation of the composition, said device optionally comprising a mold.

21. A method for producing a packing for cover, comprising
  applying to said cover a composition comprising the following individual components:
  (A) a blocked isocyanate,
  (B) an active hydrogen group-containing compound having on average two or more functional groups,
  (C) an organic substance powder having an average particle diameter of 40 to 250 $\mu$m, and
  (D) an inorganic substance powder having an average particle diameter of less than 40 $\mu$m,
and then subjecting said components to heat-curing at 100 to 250° C.

* * * * *